United States Patent [19]
Jing et al.

[11] Patent Number: 6,156,400
[45] Date of Patent: Dec. 5, 2000

[54] MULTI-LAYER COMPOSITIONS COMPRISING A FLUOROPOLYMER

[75] Inventors: Naiyong Jing; Sehyun Nam, both of Woodbury; Trang Pham, Bloomington, all of Minn.

[73] Assignee: 3M Innovative Properties Company, St. Paul, Minn.

[21] Appl. No.: 09/058,421

[22] Filed: Apr. 9, 1998

[51] Int. Cl.⁷ .............................. B32B 1/08; B32B 27/00
[52] U.S. Cl. ..................... 428/35.7; 428/195; 428/354; 428/421; 428/422
[58] Field of Search .................................. 428/354, 421, 428/422, 424.6, 35.7, 195

[56] References Cited

U.S. PATENT DOCUMENTS

| | | | |
|---|---|---|---|
| Re. 24,906 | 12/1960 | Ulrich | 206/49 |
| 3,190,178 | 6/1965 | McKenzie | 88/82 |
| 3,551,025 | 12/1970 | Bingham et al. | 350/105 |
| 4,025,159 | 5/1977 | McGrath | 350/105 |
| 4,112,213 | 9/1978 | Waldman | 526/279 |
| 4,143,204 | 3/1979 | Fang | 428/413 |
| 4,233,421 | 11/1980 | Worm | 525/343 |
| 4,315,045 | 2/1982 | Dillard et al. | |
| 4,323,557 | 4/1982 | Rosso et al. | 424/28 |
| 4,335,238 | 6/1982 | Moore et al. | 526/254 |
| 4,348,312 | 9/1982 | Tung | 428/144 |
| 4,558,142 | 12/1985 | Holland | 549/465 |
| 4,896,943 | 1/1990 | Tolliver et al. | 350/105 |
| 4,912,171 | 3/1990 | Grootaert et al. | 525/340 |
| 4,933,060 | 6/1990 | Prohaska et al. | 204/192.36 |
| 4,933,090 | 6/1990 | Gill et al. | 210/700 |
| 5,047,287 | 9/1991 | Horiuchi et al. | 428/248 |
| 5,066,098 | 11/1991 | Kult et al. | 359/540 |
| 5,069,964 | 12/1991 | Tolliver et al. | 428/325 |
| 5,086,123 | 2/1992 | Guenthner et al. | 525/276 |
| 5,170,011 | 12/1992 | Martucci | 174/47 |
| 5,212,279 | 5/1993 | Nomura et al. | |
| 5,262,490 | 11/1993 | Kolb et al. | 525/343 |
| 5,284,184 | 2/1994 | Noone et al. | 138/121 |
| 5,383,087 | 1/1995 | Noone et al. | 361/215 |
| 5,480,721 | 1/1996 | Pozzoli | 428/422 |
| 5,552,199 | 9/1996 | Blong et al. | 428/36.9 |
| 5,591,804 | 1/1997 | Coggio et al. | 525/276 |
| 5,658,670 | 8/1997 | Fukushi | 428/421 |
| 5,855,977 | 1/1999 | Fukushi | 428/36.6 |
| 5,869,157 | 2/1999 | Stoeppelmann | 428/36.91 |
| 5,916,659 | 6/1999 | Koerber | 428/86 |

FOREIGN PATENT DOCUMENTS

| | | | |
|---|---|---|---|
| 0 185 590 | 6/1986 | European Pat. Off. | C08J 5/12 |
| 0 311 292 | 4/1989 | European Pat. Off. | |
| 0 523 644 A1 | 1/1993 | European Pat. Off. | B23B 27/08 |
| 0 551 094 A1 | 1/1993 | European Pat. Off. | B32B 7/04 |
| 0 637 509 A1 | 2/1995 | European Pat. Off. | |
| 0 873 759 A2 | 12/1998 | European Pat. Off. | |
| 2 699 927 | 7/1994 | France | |
| 8281884 | 10/1996 | Japan | |
| WO 93/14933 | 8/1993 | WIPO | B32B 27/32 |
| WO 95/11464 | 4/1995 | WIPO | G02B 5/124 |
| WO 95/11466 | 4/1995 | WIPO | G02B 5/124 |
| WO 98/08679 | 3/1998 | WIPO | |
| WO 98/08879 | 3/1998 | WIPO | C08F 8/26 |

OTHER PUBLICATIONS

F.W. Billmeyer, *Textbook of Polymer Science*, 3rd ed., pp. 398–403, John Wiley & Sons, New York (1984) no month.

Brullo, R.A., "Fluoroelastomer Rubber for Automotive Applications," *Automotive Elastomer & Design*, Jun. 1985.

Brullo, R.A., "Fluoroelastomers Seal Up Automotive Future," *Materials Engineering*, Oct. 1988.

"Fluorinated Elastomers," Kirk–Othmer, *Encyclopedia of Chemical Technology*, 3rd ed., vol. 8, pp. 500–515, John Wiley & Sons, New York (1979) no month.

Kirk–Othmer, *Encyclopedia of Chemical Technology*, vol. 11, pp. 20, 21, 32, 33, 40, 41, 48, 50, 52, 62, 70, and 71, John Wiley & Sons, New York (1980) no month.

*Primary Examiner*—Blaine Copenheaver
*Attorney, Agent, or Firm*—John A. Burtis; Scott A. Bardell

[57] ABSTRACT

This invention provides a method of bonding substantially non-fluorinated polymeric material to dissimilar polymers, particularly fluoropolymer materials, utilizing a bonding composition comprising base-treated amide group-containing substantially non-fluorinated polymer. Multi-layer articles and composite constructions, including retroreflective sheeting, fuel line hoses, and adhesive articles made of a fluoropolymer layer and a substantially non-fluorinated layer are also provided.

28 Claims, No Drawings

MULTI-LAYER COMPOSITIONS COMPRISING A FLUOROPOLYMER

FIELD OF THE INVENTION

The invention relates to multi-layer constructions comprising a fluoropolymer and a substantially non-fluorinated polymeric material as well as to methods of producing same. In another aspect, this invention relates to methods of improving the adhesion between a fluoropolymer and other dissimilar materials, including polyurethanes. In yet another aspect, the invention relates to bonding compositions useful to adhere two dissimilar materials together.

BACKGROUND OF THE INVENTION

Fluorine-containing polymers (i.e., fluoropolymers or fluorinated polymers), are an important class of polymers that include, for example, fluoroelastomers and fluoroplastics. Among this broad polymer class are polymers of high thermal stability, polymers exhibiting chemical (and solvent) resistance, and polymers displaying usefulness along a broad spectrum of temperatures. Many of these polymers also are almost totally insoluble in a wide variety of organic solvents; see, for example, F. W. Billmeyer, *Textbook of Polymer Science*, 3rd ed., pp. 398–403, John Wiley & Sons, New York (1984).

Fluoroelastomers, particularly the copolymers of vinylidene fluoride with other ethylenically unsaturated halogenated monomers such as hexafluoropropylene find particular utility in high temperature applications, such as in seal gaskets and linings. See, for example, Brullo, R. A., "Fluoroelastomer Rubber for Automotive Applications," *Automotive Elastomer & Design*, June 1985, "Fluoroelastomers Seal Up Automotive Future," *Materials Engineering*, October 1988, and "Fluorinated Elastomers," Kirk-Othmer, *Encyclopedia of Chemical Technology*, 3rd ed., Vol. 8, pp. 500–515, John Wiley & Sons, New York (1979).

Fluoroplastics, particularly polychlorotrifluoroethylene, polytetrafluoroethylene, copolymers of tetrafluoroethylene and hexafluoropropylene, and poly(vinylidene fluoride), have numerous electrical, mechanical, and chemical applications. Fluoroplastics are useful, for example, as wire coatings, electrical components, seals, and in solid and lined pipes and piezoelectric detectors. See, for example, "Organic Fluorine Compounds," Kirk-Othmer, *Encyclopedia of Chemical Technology*, Vol. 11, pp. 20, 21, 32, 33, 40, 41, 48, 50, 52, 62, 70, and 71, John Wiley & Sons, New York (1980).

Multi-layer constructions containing a fluorinated polymer enjoy wide industrial application; multi-layer fluoropolymer constructions find utility in, for example, fuel line hoses and related containers and in retroflective sheeting materials. Increased concerns with fuel evaporation standards give rise to a need for fuel system components that have increased barrier properties to minimize the permeation of fuel vapors through automotive components including fuel filler lines, fuel supply lines, fuel tanks, and other components of the engine's fuel control system. Various types of constructions have been proposed to address these concerns. In general, the most successful of these are co-extruded multi-layer constructions.

Multi-layer compositions comprising a fluorinated polymer layer and a polyamide or polyolefin layer are known. U.S. Pat. No. 4,933,090 (Krevor), for example, discloses laminate tubular articles that can comprise layers of fluorocarbon elastomers, and PCT Publication WO 93/14933 (LaCourt) discloses a laminar film structure comprising a polyimide and a fluoropolymer. The use of fluorinated polymers in retroreflective sheeting also is known. U.S. Pat. Nos. 3,551,025 and 4,348,312, for example, describe products that include glass microspheres, and PCT WO 95/11466 and WO 95/11464 describe products containing retroreflective cube corner arrays.

A variety of methods can be used to increase the adhesion between a fluorinated polymer layer and a polyamide or polyolefin layer. An adhesive layer can, for example, be added between the two polymer layers. U.S. Pat. No. 5,047,287 discloses a diaphragm, suitable for use in automotive applications, that comprises a base fabric having a fluororubber layer bonded to at least one surface by an adhesive that includes an acrylonitrile-butadiene or acrylonitrile-isoprene rubber having an amino group.

Surface treatment of one or both of the layers also sometimes is employed to aid bonding. Some, for example, have taught treating fluoropolymer layers with charged gaseous atmosphere (e.g., corona treatment) and subsequently applying a layer of a second material, for example a thermoplastic polyamide. E.g., European Patent Applications 0185590 (Ueno et al.) and 0551094 (Krause et al.) and U.S. Pat. Nos. 4,933,060 (Prohaska et al.) and 5,170,011 (Martucci).

Blends of the fluoropolymer and the dissimilar layer themselves are in some cases employed as an intermediate layer to help bond the two layers together. European Patent Application 0523644 (Kawashima et al.) discloses a plastic laminate having a polyamide resin surface layer and a fluororesin surface layer. The reference recognizes the difficulties encountered when making laminates having a polyamide layer and a fluororesin layer because of the incompatibility of the two materials. The laminate of the reference is prepared by use of an intermediate layer composed of a blend of an aliphatic polyamide resin with a fluorine-containing graft copolymer.

The addition of a di- or polyamine as an auxiliary bonding agent to a "tie" layer that comprises the dissimilar, non-fluorinated polymer also has been suggested to increase the degree of chemical bonding between the fluoropolymer and the non-fluorinated layer. Such methods generally employ those fluoropolymers and non-fluorinated polymers having some measure of reactivity with the di- or polyamine to achieve an acceptable level of adhesion. Many non-fluorinated polymers that are reactive with a di- or polyamine can, however, exhibit a significant change in physical properties by the amine reaction when employed to construct such tie layers; polyurethanes, for example, can suffer a significant degradation in melt viscosity in the presence of even a minimal amount of a di- or polyamine, leading to a viscosity differential between the tie-layer it comprises and the other layers that can make it prohibitively difficult to co-process the multiple layers. Another significant drawback to the use of such tie layers lies in the presence of the di- or polyamine itself. The di- or polyamine also can be a difficult material to handle directly in any process, and any method that decreases or eliminates the necessity of direct contact with a di- or polyamine presents a substantial benefit to the art.

SUMMARY OF THE INVENTION

Briefly, in one aspect, this invention provides a method of bonding fluoropolymer to substantially non-fluorinated polymeric material, the method comprising the steps of:

(a) providing an amide group-containing substantially non-fluorinated polymer;

(b) treating the substantially non-fluorinated polymer with a suitable organic or inorganic base to form a base-treated, substantially non-fluorinated polymeric material;

(c) providing a fluoropolymer; and (d) forming a multi-layer article comprising a substantially non-fluorinated layer made of the base-treated, substantially non-fluorinated polymeric material in contact with a fluorinated layer made of the fluoropolymer and exposing the multi-layer article to temperature and pressure conditions sufficient to bond the layers.

In other aspects, the present invention provides multi-layer constructions, including retroreflective sheeting, adhesive articles, and fuel line hoses and related components, comprising multi-layer articles made according to the above-described methods.

In another aspect the invention provides a bonding composition useful to adhere two dissimilar materials to one another, said composition comprising substantially non-fluorinated polymeric material that comprises base-treated amide group-containing substantially non-fluorinated polymer.

In practice of the invention, the use of a base-treated, amide group-containing polymer to comprise a "tie" layer provides a mechanism for bonding a wide array of substantially non-fluorinated polymeric materials to layers composed of fluoropolymers. The substantially non-fluorinated polymeric layers containing the base-treated amide group-containing polymers also are processable with a fluoropolymer layer and exhibit resulting physical properties that meet or exceed the properties inherent to the polymers that comprise the composite structure.

DETAILED DESCRIPTION OF PREFERRED EMBODIMENTS

Fluoropolymer materials useful in the present invention include those fluoropolymers broadly categorized structurally into two basic classes. A first class includes those thermoplastic and elastomeric fluorinated polymers, homopolymers, copolymers, terpolymers, etc, comprising interpolymerized units derived from vinylidene fluoride (sometimes referred to as "$VF_2$" or "VDF"). Preferably fluoropolymer materials of this first class comprise at least 3% by weight of interpolymerized units derived from $VF_2$. Such polymers may be homopolymers of $VF_2$ or terpolymers and copolymers of $VF_2$ and other ethylenically unsaturated monomers.

$VF_2$-containing polymers and copolymers can be made by well-known conventional means, for example by free-radical polymerization of $VF_2$ with or without other ethylenically-unsaturated monomers. The preparation of colloidal aqueous dispersions of such polymers and copolymers is described, for example, in U.S. Pat. No. 4,335,238. It follows the customary process for copolymerizing fluorinated olefins in colloidal aqueous dispersions, which is carried out in the presence of water-soluble initiators that produce free radicals, such as, for example, ammonium or alkali metal persulfates or alkali metal permanganates, and in the presence of emulsifiers, such as, in particular, the ammonium or alkali metal salts of perfluorooctanoic acid.

Useful fluorine-containing monomers include hexafluoropropylene ("HFP"), tetrafluoroethylene ("TFE"), chlorotrifluoroethylene ("CTFE"), 2-chloropentafluoro-propene, perfluoroalkyl vinyl ethers, e.g. $CF_3OCF=CF_2$ or $CF_3CF_2OCF=CF_2$, 1-hydropentafluoropropene, 2-hydropentafluoropropene, dichlorodifluoroethylene, trifluoroethylene, 1,1-dichlorofluoroethylene, vinyl fluoride, and perfluoro-1,3-dioxoles such as those described in U.S. Pat. No. 4,558,142 (Holland et al). Certain fluorine-containing di-olefins also are useful, such as perfluorodiallylether and perfluoro-1,3-butadiene. Said fluorine-containing monomer or monomers also may be copolymerized with fluorine-free terminally unsaturated olefinic comonomers, e.g., ethylene or propylene. Preferably at least 50% by weight of all monomers in a polymerizable mixture are fluorine-containing. Said fluorine-containing monomer may also be copolymerized with iodine- or bromine-containing cure-site monomers in order to prepare peroxide curable polymer. Suitable cure-site monomers include terminally unsaturated monoolefins of 2 to 4 carbon atoms such as bromodifluoroethylene, bromotrifluoroethylene, iodotrifluoroethylene, and 4-bromo-3,3,4,4-tetrafluorobutene-1.

Commercially available fluoropolymer materials of this first class include, for example, THV 200 fluoropolymer (available from Dyneon LLC of Saint Paul, Minn.), THV 500 fluoropolymer (also available from Dyneon LLC), Kynar™ 740 fluoropolymer (available from Elf Atochem North America, Inc.), Fluorel™ FC-2178 fluoropolymer (available from Dyneon LLC), and those fluoropolymers sold under the "Viton" tradename by DuPont.

A second class of fluorinated material useful in the practice of the invention broadly comprises those thermoplastic and elastomeric fluorinated polymers, copolymers, terpolymers, etc, comprising interpolymerized units derived from one or more of hexafluoropropylene ("HFP") monomers, tetrafluoroethylene ("TFE") monomers, chlorotrifluoroethylene monomers, and/or other perhalogenated monomers and further derived from one or more hydrogen-containing and/or non-fluorinated olefinically unsaturated monomers. Useful olefinically unsaturated monomers include alkylene monomers such as ethylene, propylene, 1-hydropentafluoropropene, 2-hydropentafluoropropene, vinylidene fluoride, etc.

Fluoropolymers of this second class can be prepared by methods known in the fluoropolymer art. Such methods include, for example, free-radical polymerization of hexafluoropropylene and/or tetrafluoroethylene monomers with non-fluorinated ethylenically-unsaturated monomers. In general, the desired olefinic monomers can be copolymerized in an aqueous colloidal dispersion in the presence of water-soluble initiators which produce free radicals such as ammonium or alkali metal persulfates or alkali metal permanganates, and in the presence of emulsifiers such as the ammonium or alkali metal salts of perfluorooctanoic acid. See for example U.S. Pat. No. 4,335,238.

Representative of the fluoropolymer materials of the second class are poly(ethylene-co-tetrafluoroethylene) (ETFE), poly(tetrafluoroethylene-copropylene), poly(chlorotrifluoroethylene-co-ethylene) (ECTFE), and the terpolymer poly(ethylene-co-tetrafluoroethylene-co-hexafluoropropylene), among others; all of which may be prepared by the above-described known polymerization methods. Many useful fluoropolymer materials also are available commercially, for example from Dyneon LLC under the trade designations Hostaflon™ X6810, and X6820; from Daikin America, Inc., under the trade designations Neoflon™ EP-541, EP-521, and EP-610; from Asahi Glass Co. under the trade designations Aflon™ COP C55A, C55AX, C88A; and from DuPont under the trade designations Tefzel™ 230 and 290.

The above-described fluoropolymers may be blended with one another or blended with another fluorinated or non-fluorinated polymer to form a composite blend material useful to construct a fluorinated layer. Polyvinylidene fluoride, for example, may be blended with polymethylmethacrylate. The described fluoropolymers may also be dehydrofluorinated according to the method described in WO 98/08879.

The substantially non-fluorinated, or "tie," layer of the invention comprises, in its most essential aspect, a melt-processable, base-treated substantially non-fluorinated polymeric material comprising an amide group-containing substantially non-fluorinated polymer that is treated by contacting it with a suitable organic or inorganic base. One or more additional non-fluorinated polymers miscible with the base-treated polymeric material may also be blended into the tie layer. Some amount of one or more aliphatic di- or polyamines also may be added to the tie layer to further improve its bonding properties. The tie layer material, comprising the above components along with any additional adjuvants, may be made by melt mixing the components in accordance with conventional methods as a batch process or by a twin screw extruder as a continuous process.

The melt-processable, amide group-containing substantially non-fluorinated polymer may be treated with the inorganic base in any suitable manner that places the non-fluorinated polymer in direct contact with the base. Typically this is most easily accomplished by treating the non-fluorinated polymer with an aqueous solution of an appropriate base of any reasonable concentration, usually by heating the polymer in a bath of refluxing base, or by dry blending the base directly with the polymer. The resulting base-treated substantially non-fluorinated polymeric material may then be processed with the fluoropolymer or other dissimilar material to form a multi-layer article or composite structure that exhibits an acceptable degree of interlayer bond strength.

Useful amide group-containing substantially non-fluorinated polymers include polyamides, polyurethanes, polyimides, polyureas, polyamide imides, and polyether imides, polyamides being principally preferred. Useful polyamides for this purpose generally are available commercially. For example, polyamides such as any of the well-known nylons are available from a number of sources. Particularly preferred polyamides are nylon 6, nylon 6,6, nylon 11, or nylon 12. In addition to these polyamide materials, other nylon materials such as nylon 6,12, nylon 6,9, nylon 4, nylon 4,2, nylon 4,6, nylon 7, and nylon 8 also may be used. Ring containing polyamides, e.g., nylon 6,T and nylon 6,1, may also be used. Polyether-containing polyamides, such as Pebax™ polyamides, may also be used. It should be noted that the selection of a particular polyamide material should be based upon the physical requirements of the particular application for the resulting article.

Melt-processable polyamide imides, polyether imides, and polyimides may also be used as the amide group-containing substantially non-fluorinated base polymer. The term "melt-processable" is used herein to describe polymers that are molten or melt-processable under the conditions to which they are subjected in practicing the methods of the invention. The most useful polyamides, polyamide imides, polyether imides, and polyimides will be those that are melt-processable at or below about 300° C., more preferably at or below about 260° C.

Useful polyamide imides are available commercially and include, for example, polyamide imides sold under the TORON tradename by the Amoco Chemical Corporation of Chicago, Ill. Useful polyether imides also are commercially available including those sold under the tradename ULTEM by General Electric Plastics of Pittsfield, Mass. Other useful commercially available base polymers may be blended with the amide-containing polymers. These include polyesters, polycarbonates, polyketones, and polyureas. These materials are generally available commercially including SELAR polyesters from DuPont (Wilmington, Del.), LEXAN polycarbonates (General Electric, Pittsfield, Mass.), KADEL polyketones (Amoco, Chicago, Ill.), and SPECTRIM polyureas (Dow Chemical, Midland, Mich.).

Polyurethanes may also be employed as the amide-containing substantially non-fluorinated polymer. Useful polyurethanes include aliphatic, cycloaliphatic, aromatic, and polycyclic polyurethanes. These polyurethanes typically are produced by reaction of a polyfunctional isocyanate with a polyol, often in the presence of a catalyst, according to well known reaction mechanisms. Useful diisocyanates for employment in the production of a polyurethane include, for example, dicyclohexylmethane-4,4'-diisocyanate, isophorone diisocyanate, 1,6-hexamethylene diisocyanate, cyclohexyl diisocyanate, and diphenylmethane diisocyanate. Combinations of one or more polyfunctional isocyanates may also be used. Useful polyols include polypentyleneadipate glycol, polytetramethylene ether glycol, polyethylene glycol, polycaprolactone diol, poly-1,2-butylene oxide glycol, and combinations thereof. Chain extenders such as butanediol or hexanediol may also optionally be used in the reaction. Many useful polyurethanes also are commercially available and include: PN-04 or PN-09 from Morton International, Inc., Seabrook, N.H., and X-4107 from B. F. Goodrich Company, Cleveland, Ohio.

Any of a broad class of organic and inorganic bases may be employed to treat the amide group-containing substantially non-fluorinated polymer in the manner previously above. Such classes of bases include those depicted by any one of the formulas:

$$X^+(OH)^-_n$$

$$X^+(OR)^-_n$$

$$X^+(OCY_2R_f)^-_n$$

$$X^+(OSi(R)_3)^-_n$$

$$X^+(SC(O)R)^-_n$$

where:

n is 1 or 2;

X is a monovalent or divalent alkali or alkaline earth ion, preferably potassium or sodium, or is an ammonium ion;

R is a substituted or unsubstituted alkyl, aryl, allyl, aralkyl or arallyl group that may contain one or more catenary or noncatenary heteroatoms such as nitrogen, sulfur and oxygen, and that may contain linear or branched and cyclic or acyclic segments; R preferably contains no more than about six carbon atoms;

$R_f$ is a partially or fully fluorinated, substituted or unsubstituted alkyl, aryl, allyl, aralkyl or arallyl group that also may contain one or more catenary or noncatenary heteroatoms such as nitrogen, sulfur and oxygen, and that may also contain linear or branched and cyclic or acyclic segments; like the above-defined R group, $R_f$ preferably contains no more than about six carbon atoms; and each Y is independently a hydrogen atom or is an R or $R_f$ group as above-defined provided, however, that both Y groups are not $R_f$.

Also useful as bases are amine compounds other than di- or polyamines. Representative classes of such amine compounds include aliphatic, aryl and amidine amine compounds, preferably a secondary or tertiary amine compound. Examples of these include 4-dimethyl amino pyridine, triisooctyl amine, 1,8-diazabicyclo(2,2,2)-octane, 1,5-diazabicyclo[4.3.0] non-5-ene, 1,8-diazabicyclo[5.4.0] undec-7-ene (sometimes referred to more simply as "DBU"), imidazole, and benzotriazole, to name a few.

A useful such class of amine compounds can be represented by the following formula:

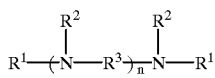

where:
- $R^1$ is independently selected from substituted and unsubstituted alkyl, cycloalkyl, aryl, aralkyl, and alkaryl groups;
- $R^2$ is independently selected from H, and substituted and unsubstituted alkyl, cycloalkyl, aryl, aralkyl and alkaryl groups;
- $R^3$ is selected from substituted or unsubstituted divalent alkylene, cycloalkylene, arylene, aralkylene, and alkarylene groups; n is a number from 0 to about 100.

Other bases useful in the present invention include ammonium carbonate, and sodium sulfide.

The polymeric layers comprising the composite structures of the invention may include optional additives, such as those typically used in other thermoplastic applications. Such additional adjuvants include, for example, pigments, tackifiers, fillers, electrically conductive materials (such as those described in U.S. Pat. No. 5,552,199), electrically insulative materials, stabilizers, antioxidants, lubricants, processing aids, impact modifiers, viscosity modifiers, as well as any appropriate mixture or mixtures thereof.

One or more organo-onium compounds also may be incorporated into the substantially non-fluorinated polymeric material as a catalytic agent to improve further the bonding characteristics of the material. As is known in the art, an organo-onium is the cationic portion of the salt of a Lewis base (e.g. phosphine, amine, ether, and sulfide) resulting from the reaction of the Lewis base with a suitable alkylating agent (e.g., an alkyl halide or acyl halide) resulting in an expansion of the valence of the electron donating atom of the Lewis base and a positive charge on the organo-onium compound. Many of the organo-onium compounds useful in the present invention contain at least one heteroatom, i.e., a non-carbon atom such as N, P, S, O, bonded to organic or inorganic moieties. One class of quaternary organo-onium compounds particularly useful in the present invention broadly comprises relatively positive and relatively negative ions wherein a phosphorus, arsenic, antimony or nitrogen generally comprises the central atom of the positive ion, and the negative ion may be an organic or inorganic anion (e.g., halide, sulfate, sulfonate, acetate, phosphate, phosphonate, hydroxide, alkoxide, phenoxide, bisphenoxide, etc.).

Many of the useful organo-onium compounds are described and known in the art. See, for example, U.S. Pat. Nos. 4,233,421 (Worm), 4,912,171 (Grootaert et al.), 5,086,123 (Guenthner et al.), and 5,262,490 (Kolb et al.) all of whose descriptions are herein incorporated by reference. Fluorinated oniums, such as those described in U.S. Pat. No. 5,591,804 (Coggio et al.) may also be employed. Representative examples include the following individually listed compounds and mixtures thereof:

triphenylbenzyl phosphonium chloride
tributylallyl phosphonium chloride
tributylbenzyl ammonium chloride
tetrabutyl ammonium bromide
triphenyl sulfonium chloride
tritolyl sulfonium chloride
8-benzyl-1,8-diazabicyclo [5,4,0]-7-undecenium chloride
benzyl tris(dimethylamino) phosphonium chloride
benzyl(diethylamino)diphenylphosphonium chloride Methods known in the fluoropolymer art can be used to produce a bonded multi-layer article where a fluoropolymer material is in substantial contact with the substantially non-fluorinated polymeric blend material. For instance, the fluoropolymer and the substantially non-fluorinated polymeric material can be formed into thin film layers by known methods. The fluorinated layer and the substantially non-fluorinated layer can then be laminated together under heat and/or pressure to form a bonded, multi-layer article. Alternatively, the fluoropolymer and the substantially non-fluorinated polymeric blend material, along with one or more additional layers where desired, can be co-extruded into a multi-layer article. See e.g., U.S. Pat Nos. 5,383,087, and 5,284,184, whose descriptions are incorporated herein by reference for such purpose.

The heat and pressure of the method by which the layers are brought together (e.g., coextrusion or lamination) may be sufficient to provide adequate adhesion between the layers. It may, however, be desirable to further treat the resulting multi-layer article, for example with additional heat, pressure, or both, to provide additional adhesive bond strength between the layers. One way of supplying additional heat, when the multi-layer article is prepared by extrusion, is by delaying the cooling of the multi-layer article after co-extrusion. Alternatively, additional heat energy may be added to the multi-layer article by laminating or coextruding the layers at a temperature higher than necessary for merely processing the several components. Or, as another alternative, the finished multi-layer article may be held at an elevated temperature for an extended period of time. For example the finished multi-layer article may be placed in an oven or heated liquid bath or a combination of both.

Similar methods may also be employed to produce a bonded multi-layer article where the substantially non-fluorinated polymeric blend material is in substantial contact with a dissimilar non-fluorinated material.

The methods of the present invention provide multi-layer articles exhibiting ease of processability and improved inter-layer adhesive bond strength between a fluorinated layer and a substantially non-fluorinated layer or between two substantially dissimilar non-fluorinated layers. Multi-layer articles of the invention can have utility as films, containers, or tubing that require specific combinations of barrier properties, high and low temperature resistance, and chemical resistance. Such methods and compositions are particularly useful for making multi-layer articles comprising a fluoropolymer material suitable for use in motor vehicles, for example as fuel-line hoses, and for films and blow-molded articles such as bottles, where chemical resistance and barrier properties are important.

The multi-layer articles can have two, three, or even more separate layers. For example, the present invention contemplates a multi-layer article including a fluorinated layer, a substantially non-fluorinated layer, and optionally further comprising one or more additional layers comprising fluorinated or non-fluorinated polymers. As a specific example, a bi-layer article can be prepared according to the present invention, the bi-layer article comprising a fluorinated layer and a substantially non-fluorinated layer containing the amine-functionalized base polymer, wherein the bonding composition is used to increase the adhesive bond strength between the two layers. One or more additional layers comprising fluorinated or non-fluorinated polymer can, either thereafter or simultaneously (i.e., to form a tri-layer article), be bonded to one or more of the fluorinated layer or substantially non-fluorinated layer, to produce a multi-layer article having three or more layers.

Any appropriate fluorinated or non-fluorinated polymeric material may be utilized as an additional layer; useful among them are any of a number of well known, hydrocarbon-based polymers. Thermoplastic polyamides, polyurethanes, polyolefins, polyesters, and acrylate and methacrylate polymers and copolymers find utility in such embodiments. Any of the previously-described fluoropolymers may also be added to the multi-layer articles of the invention.

Utilizing techniques of selection, a multi-layer composite article may be constructed having the combined benefits of each constituent layer. For instance, a fluoropolymer that exhibits particular advantage in bonding to a chosen substantially non-fluorinated polymeric material (such as the commercially available THV 200) may be used as the fluoropolymer layer immediately adjacent to the layer of substantially non-fluorinated polymer, and a fluoropolymer exhibiting relatively superior vapor barrier properties (such as the commercially available THV 500) may be bonded to the immediate fluoropolymer layer. A composite so formed possesses the combined advantages of its constituent layers: superior bond strength and superior vapor barrier properties.

Transparent embodiments of multi-layer compositions of the present invention may find particular utility in the construction of retroreflective sheeting articles generally, and particularly when resistance to chemical agents, solvents, soiling, and/or reduced moisture vapor transmission and/or good interlayer adhesion in flexible sheetings subject to severe bending and flexing is required.

The compositions of this invention may be rendered retroreflective by forming retroreflective elements on one side of the composition, or alternatively, by attaching a retroreflective base sheet by means of a transparent adhesive or by direct lamination. The retroreflective base sheet may comprise a member with cube corner retroreflective elements or may comprise a microsphere-based retroreflective structure, e.g. comprising a monolayer of transparent microspheres and reflective means disposed on the opposite side of the monolayer from the multi-layer composition. It is preferred that the base layer is disposed on a non-fluoropolymer layer of the multi-layer composition. An embodiment of this invention includes the encapsulated retroreflective sheeting article as is disclosed in U.S. Pat. No. 3,190,178, in which the cover layer is provided by a multi-layer composition according to the present invention.

Retroreflective articles of the invention may be made in rigid or flexible form. Multi-layer compositions of the present invention may be used as barrier layers. An embodiment of the present invention includes articles in accordance with U.S. Pat. No. 5,069,964 which is incorporated herein by reference, in which the plasticizer-resistant barrier layer comprises a multi-layer composition in accordance with the present invention. The multi-layer compositions of the present invention may find particular utility in the construction of flexible retroreflective sheeting articles. A preferred embodiment of the present invention includes a retroreflec-tive article in accordance with PCT WO 95/11464 or WO 95/11466, both of which are incorporated herein by reference, wherein the flexible overlay film described in PCT WO 95/11464 or the flexible body layer of WO 95/11466 is constituted by a multi-layer composition in accordance with the invention. Suitable fluoropolymers comprising interpolymerized units of vinylidene fluoride of the type specified for use with flexible sheeting in accordance with these two patent applications may be poly (vinylidene fluoride-cohexafluoropropylene), for example, Kynar Flex™-2800 available from Elf Atochem North America, Inc., Philadelphia, Pa., or poly (tetrafluoroethylene-co-hexafluoropropylene-co-vinylidene fluoride), for example, THV 200 or 500. The non-fluoropolymer layer in such constructions may be any of the non-fluoropolymers specified in the above patent applications, for example, ionomeric ethylene copolymers, low density polyethylenes, polyethylene copolymers, or aliphatic or aromatic polyurethanes or similar compounds. For highly flexible products, a multi-layer composition of this invention that includes a THV layer and a polyurethane layer is particularly preferred. The microstructure elements including either solidly connected or segregated cube comers may be microreplicated, preferably onto the non-fluoropolymer layer. Alternatively, the multi-layer compositions may be adhered to microstructure elements. As will be understood, any conventional form of retroreflective microstructure elements may be used including, for example, arrays of canted, tiled, specially shaped, colored, or colorless cube corner elements.

Similarly, multi-layer compositions may be used with retroreflective sheeting products including microspheres in a base layer. Specific embodiments of the invention include retroreflective articles according to U.S. Pat No. 4,896,943, U.S. Pat. No. 4,025,159 or U.S. Pat No. 5,066,098, all of which are included herein by reference, in which the cover film of U.S. Pat. Nos. 4,896,943 or 4,025,159 or the cover sheet of U.S. Pat. No. 5,066,098 is constituted by a multi-layer composition in accordance with this invention. The multi-layer compositions of the present invention further may themselves include retroreflective micro-elements, such as transparent microspheres, incorporated into the fluoropolymer or the non-fluoropolymer layer, for example in a further embodiment of the present invention, the fluoropolymer layer of a multi-layer composition according to the present invention may constitute the continuous overlaying transparent topcoat of U.S. Pat. No. 3,551,025 which is incorporated here by reference and the non-fluoropolymer layer may constitute the binder of the same.

The adhesive articles taught by the present invention comprise an adhesive layer composed of an adhesive material disposed as the outer layer of the multilayer composite constructions already described and such articles may find particular utility as paint replacement films. Any of a wide variety of adhesives may be usefully incorporated into such articles, including those which are thermoplastic (fusible), thermosetting (cure to a crosslinked state), or combinations of both. One particular class of adhesives are those which are pressure-sensitive in nature. That is, they display permanent and aggressive tackiness to a wide variety of substrates at room temperature. Many pressure-sensitive adhesive materials are known in the adhesive art, and those that are suitable may comprise acrylate esters, acrylamides, thermoplastic elastomers, natural rubbers, olefins, silicones, vinyl ethers, esters, urethanes, etc., as well as selected polymers, and copolymers of these materials, and mixtures thereof. The actual choice of the adhesive is largely dependent on the end use to which an artisan will apply the final adhesive article. Some useful pressure sensitive adhesives are described, for example, in U.S. Pat. Nos. Re. 24,906, 4,112,213, 4,323,557. Those skilled in the art will recognize that the aforementioned adhesive components might also include various chemical modifiers so as to provide utility required by a particular application; e.g., tackifiers, crosslinkers, stabilizers, initiators, etc.

Also useful are various thermosetting adhesives that can cure, for example, upon exposure to moisture, heat, radiation, etc. to an infusible, crosslinked state. Useful thermosetting adhesives include those formed by addition polymerization methods from, for example, unsaturated polyesters, epoxies, urethanes, cyanoacrylates, as well as mixture of these components or polymers, copolymers, graft copolymers, and interpenetrating networks comprising these components. Further information about many different types of adhesive may be found in I. Skeist, Ed., *Handbook of Adhesives,* Third Edition, 1990.

To apply an adhesive layer to the substrate backing material, any known coating method can be used, such as gravure coating methods, spray coating methods, die coating methods such as curtain coating and fluid bearing die methods, hot melt coating methods, etc. The particular method chosen can depend on the type of adhesive chosen (i.e., a structural adhesive versus a pressure sensitive adhesive) as well as the chemistry of the chosen adhesive. Optionally, after the adhesive is applied to the substrate, the adhesive layer can be cured by known methods such as by exposure to radiation, heat, moisture, etc.

Other embodiments of the adhesive articles provided herein comprise three or more additional layers, positioned on either the opposing surface of a fluorinated or substantially non-fluorinated layer, onto at least one of the outer layers of which is placed an adhesive material. It will be understood that where one or more said additional layers comprise a substantially non-fluorinated polymer, that additional layer also can contain bonding composition. This would prove useful, for example, where a fluoropolymer layer is "sandwiched" between two dissimilar polymeric layers, and to bond the three layers together, both dissimilar layers contacting the fluorinated layer could contain bonding composition. Additional layers may then be placed on either or both sides of such a construction.

In a specific embodiment of the invention, the adhesive article can find application as a drag reducing article such as a drag reduction film. In such an application, a fluoropolymer layer is formed into a drag reducing patterned layer before, during, or after bonding to one or more layers of the article. Such a drag reducing patterned fluoropolymer layer may be prepared, for example, by extruding or coating the fluoropolymer onto a patterned sheet or roll. When the fluoropolymer is removed from the patterned sheet or roll, a surface of the fluoropolymer will be formed into a drag reducing pattern. The non-patterned surface of the patterned fluoropolymer layer is bonded to other layers, including the substantially non-fluorinated layer, to produce a drag reducing adhesive article. Such a drag reducing adhesive article can reduce the resistance to drag created by a fluid (e.g., air, gas, water, etc.) flowing across the patterned fluorinated layer. The outer, exposed surface of such an article is provided with a drag reducing pattern. While a variety of waveforms may be employed to produce the patterned layer, those that are preferred typically comprise a series of essentially parallel peaks separated by a series of essentially parallel valleys. The patterned surface may be a symmetric saw tooth pattern in which each of the peaks are identical as are each of the valleys, although parallel peaks of different heights may be separated by a series of parallel valleys. The saw tooth pattern may also comprise alternating, parallel, asymmetric peaks separated by a series of parallel, asymmetric valleys.

The dimensions of the peaks and valleys are not critical provided that whatever patterned surface is employed, it provides a desired reduction in drag. The optimum dimensions are somewhat dependent upon the speed at which the body to be covered passes through the fluid (or the speed at which the fluid passes over the body). It has been found that peaks having a height of about 10 to 250 microns (about 0.4 to 10 mils) are useful. Within this range it is preferred that the peaks be about 20 to 150 microns (about 0.8 to 6 mils) high for high speed uses (e.g., aircraft). The peak-to-peak spacing between adjacent peaks can likewise vary depending upon, for example, the application of the article. A spacing of about 10 to 250 microns (about 0.4 to 10 mils) is useful, although, for aircraft applications, a spacing of about 20 to 150 microns (about 0.8 to 6 mils) is preferred. The included angle between adjacent peaks can also vary. While flat and round bottom valleys may be useful, it is preferred that the valleys and peaks be generally V-shaped and have an included angle of from 15° to 140°, more preferably from 50° to 60°.

The drag reduction articles of the invention may readily be applied to a variety of bodies to reduce the drag experienced when that body moves through a fluid medium or when a fluid moves past the body. Preferably the article is positioned on the body such that the patterned surface will provide maximum drag reduction. When the patterned surface comprises essentially parallel peaks and valleys, maximum drag reduction is achieved when the peaks and valleys are generally parallel to the fluid flow. Bodies to which the drag reducing article may be applied include the surface of an airplane, the hull of a boat or other watercraft, the surface of the motor vehicle, or the interior surface of a fluid-conveying conduit. The patterned adhesive articles of the invention also may be used as patterned paint replacement films and may also be employed to achieve certain desired optical effects that can be utilized to alter the appearance of the body onto which they are applied.

The following examples are offered to aid in the understanding of the present invention and are not to be construed as limiting the scope thereof. Unless otherwise indicated, all parts and percentages are by weight.

EXAMPLES

TEST PROCEDURES

Peel Strength

Peel strength of laminated samples was determined following the test procedures described in ASTM D-1876 entitled "Standard Test Method for Peel Resistance of Adhesives", more commonly known as the "T-peel" test. Peel data was generated using an Instron™ model 1125 tester (available from Instron Corp., Canton, Mass.) equipped with a Sintech Tester 20 (available from MTS Systems Corporation, Eden Prairie, Minn.). The Instron tester was operated at a cross-head speed of 100 mm/min. Peel strength, which is reported in kg/2.54 cm width as an average of three samples, was calculated as the average load measured during the peel test.

TIE-LAYER PREPARATIONS

Example 1

Base treated nylon was prepared by heating nylon pellets (Vestamido™ L2101F, available from Hills America, Inc., Piscataway, N.J., 100 g), with stirring, at a gentle reflux in methanolic KOH (6.0 g KOH in 150 mL MeOH) overnight. The reaction mixture was cooled to room temperature, the nylon pellets separated by filtration, washed once with methanol (60 mL), and dried at 60° C. under reduced pressure (30 mm Hg) for 4–6 hours. A portion of the dried, based treated nylon was subsequently pressed into a 0.20 mm thick film by pressing between Teflon™ cloth at 200° C. in a Wabash Hydraulic Press at approximately 30 kPa initial pressure. The film was cut into 2.54 cm×7.62 cm coupons for subsequent conversion into peel test specimens.

Example 2

A base treated nylon film was prepared substantially as described in Example 1 except that ethanolic KOH was used instead of methanolic KOH and the treated nylon pellets were washed with ethanol.

Example 3

A base treated nylon film was prepared substantially as described in Example 1 except that ethanolic Ba(OH)$_2$ was used instead of methanolic KOH and the treated nylon pellets were washed with ethanol.

Example 4

Base treated nylon was prepared by compounding a mixture of nylon pellets (Vestamido™ L2101F, 24.75 g) and potassium hydroxide (0.25 g) in a Plasticorder™ (an internal bowl mixer equipped with roller blades, available from C. W. Brabender Instruments, Inc., South Hackensack, N.J.) at 200° C. for 10 minutes at a mixing rate of 60–70 revolutions per minute (rpm). After mixing, a portion of the compounded material was pressed into a 0.20 mm thick film by pressing between Teflon™ cloth at 200° C. in a Wabash Hydraulic Press at approximately 30 kPa pressure. The film was cut into 2.54 cm×7.62 cm coupons for subsequent conversion into peel test specimens.

Example 5

A based treated nylon film was prepared substantially as described in Example 4 except that the compounding mixture consisted of nylon pellets (Vestamido™ L2101F, 98.0 g) and potassium hydroxide (2.0 g).

Example 6

A based treated nylon film was prepared substantially as described in Example 4 except that the compounding mixture consisted of nylon pellets (Vestamido™ L2101F, 24.75 g), potassium hydroxide (0.25 g), and tetrabutyl phosphonium bromide (0.25 g, available from Aldrich Chemical Co., Inc., Milwaukee, Wis.).

Example 7

A based treated nylon film was prepared substantially as described in Example 4 except that the compounding mixture consisted of nylon pellets (Vestamido™ L2101F, 24.875 g), potassium hydroxide (0.125 g), and 1,12-diamindodecane (DDDA, 0.125 g, available from Aldrich Chemical co., Inc.).

Example 8

A based treated nylon film was prepared substantially as described in Example 1 except that aqueous ammonium hydroxide (28 mL of a 28–30 wt. % NH$_3$) was used in place of the methanolic KOH.

Example 9

A based treated nylon film was prepared substantially as described in Example 4 except that the compounding mixture consisted of nylon pellets (Vestamido™ L2101F, 24.875 g), 1,8-Diazabicyclo[5.4.0]undec-7-ene (DBU, available from Aldrich Chemical Co., Inc., 0.25 g), and tetrabutyl phosphonium bromide (0.25 g).

Example 10

A based treated nylon film was prepared substantially as described in Example 4 except that the compounding mixture consisted of nylon pellets (Vestamido™ L2101F, 20.0 g), and sodium phenoxide, available from Aldrich Chemical Co., Inc., 0.6 g).

Example 11

A based treated nylon film was prepared substantially as described in Example 4 except that the compounding mixture consisted of nylon pellets (Vestamido™ L2101F, 20.0 g), and sodium trimethylsilanolate, (available from Aldrich Chemical Co., Inc., 0.6 g).

Example 12

Nylon pellets were treated with KOH substantially as described in Example 4 except that the compounding mixture consisted of nylon pellets (Vestamido™ L2101F, 99.0 g) and potassium hydroxide (1.0 g). Polyurethane pellets (Morthane™ L424.167, MI=9.8, an aliphatic polyurethane, available from Morton International, Chicago, Ill., 50 g) and the base treated nylon (50 g) were subsequently compounded in the Plasticorder™ for 10 minutes at 200° C. After mixing, a portion of the compounded material was pressed into a 0.20 mm thick film by pressing between Teflon™ cloth at 200° C. in a Wabash Hydraulic Press at approximately 30 kPa pressure.

Example 13

Polyurethane pellets (Morthane™ L424.167, 80 g) and base treated nylon prepared as described in Example 5 (20 g) were compounded in the Plasticorder™ for 10 minutes at 200° C. After mixing, a portion of the compounded material was pressed into a 0.20 mm thick film by pressing between Teflon™ cloth at 200° C. in a Wabash Hydraulic Press at approximately 30 kPa pressure.

Example 14

Polyurethane pellets (Morthane™ L424.167, 50 g) and base treated nylon prepared as described in Example 5 (50 g) were compounded in the Plasticorder™ for 10 minutes at 200° C. After mixing, a portion of the compounded material was pressed into a 0.20 mm thick film by pressing between Teflon™ cloth at 200° C. in a Wabash Hydraulic Press at approximately 30 kPa pressure.

Example 15

Based treated polyurethane film was prepared by heating polyurethane pellets (Morthane™ L424.167, 100 g), with stirring, at a gentle reflux in methanolic NH$_4$OH (20 mL of 28–30% NH$_3$ aqueous solution in 200 mL MeOH) overnight. The reaction mixture was cooled to room temperature, the polyurethane pellets separated by filtration, washed once with methanol (60 mL), and dried at 60° C. under reduced pressure (30 mm Hg) for 4–6 hours. A portion of the dried, based treated polyurethane was subsequently pressed into a 0.20 mm thick film by pressing between Teflon™ cloth at 200° C. in a Wabash Hydraulic Press at approximately 30 kPa pressure. The film was cut into 2.54 cm×7.62 cm coupons for subsequent conversion into peel test specimens.

Example 16

Base treated polyurethane film was prepared by heating polyurethane pellets (Morthane™ L424.167, 25.0 g), with stirring, at 35–40° C. in aqueous 5.3 N KOH for approximately 12 hours. The reaction mixture was cooled to room temperature, the polyurethane pellets separated by filtration, washed once with water (50 mL), and dried at 60° C. under reduced pressure (30 mm Hg) for 4–6 hours. A portion of the dried, based treated polyurethane was subsequently pressed into a 0.20 mm thick film by pressing between Teflon™ cloth at 200° C. in a Wabash Hydraulic Press at approximately 30 kPa initial pressure. The film was cut into 2.54 cm×7.62 cm coupons for subsequent conversion into peel test specimens.

Example 17

A based treated polyurethane film was prepared substantially as described in Example 4 except that the compounding mixture consisted of polyurethane pellets (Morthane™ L424.167, 20.0 g) and potassium tert-butoxide (available from Aldrich Chemical Co., 0.2 g). A portion of the compounded mixture was subsequently pressed into a 0.20 mm thick film by pressing between Teflon™ cloth at 200° C. in a Wabash Hydraulic Press at approximately 30 kPa initial pressure. The film was cut into 2.54 cm×7.62 cm coupons for subsequent conversion into peel test specimens.

Example 18

A based treated polyurethane film was prepared substantially as described in Example 17 except that the compounding mixture consisted of polyurethane pellets (Morthane™ L424.167, 20.0 g) and sodium trimethylsilanolate (available from Aldrich Chemical Co., 0.6 g).

Example 19

A based treated polyurethane film was prepared substantially as described in Example 17 except that the compounding mixture consisted of polyurethane pellets (Morthanem L424.167, 20.0 g) and sodium 2,2,2-trifluoroethoxide (0.3 g). Sodium 2,2,2-trifluoroethoxide was prepared by the reaction of 2,2,2-trifluoroethanol with a molar equivalent weight of sodium methoxide at room temperature and subsequently removing the methanol in a rotary evaporator.

Example 20

A based treated polyurethane film was prepared substantially as described in Example 17 except that the compounding mixture consisted of polyurethane pellets (Morthane™ L424.167, 20.0 g) and sodium thioacetate (available from Aldrich Chemical Co., 0.2 g).

Example 21

A based treated polyurethane film was prepared substantially as described in Example 4 except that the compounding mixture consisted of polyurethane pellets (Morthanem L424.167, 24.25 g), 1,8-Diazabicyclo[5.4.0]undec-7-ene (0.25 g), and tetrabutyl phosphonium bromide (0.25 g). A portion of the based treated polyurethane was subsequently pressed into a 0.20 mm thick film by pressing between Teflon™ cloth at 200° C. in a Wabash Hydraulic Press at approximately 30 kPa initial pressure.

Example 22

A based treated polyurethane film was prepared substantially as described in Example 21 except that the compounding mixture consisted of polyurethane pellets (Morthane™ L424.167, 94.0 g), Ammonium carbonate (5.0 g), and tetrabutyl phosphonium bromide (1.0 g).

Example 23

A based treated polyurethane film was prepared substantially as described in Example 21 except that the compounding mixture consisted of polyurethane pellets (Morthane™ L424.167, 94.0 g), sodium trimethylsilanolate (0.6 g), and tetrabutyl phosphonium bromide (1.0 g).

Comparative Example C-1

A mixture of nylon pellets (Vestamido™ L2101F, 24.75 g) and 1,12-diamindodecane (0.25 g) were compounded in a Plasticorder™ at 200° C. for 10 minutes at a mixing rate of 60–70 rpm. After mixing, a portion of the compounded material was pressed into a 0.20 mm thick film by pressing between Teflon™ cloth at 200° C. for 30 seconds at approximately 30 kPa initial pressure. The film was cut into 2.54 cm×7.62 cm coupons for subsequent conversion into peel test specimens.

Comparative Example C-2

A mixture of nylon pellets (Vestamido™ L2101F, 24.87 g)and 1,12-diamindodecane (0.125 g) were compounded in a Plasticorder™ at 200° C. for 10 minutes at a mixing rate of 60–70 rpm. After mixing, a portion of the compounded material was pressed into a 0.20 mm thick film by pressing between Teflon™ cloth at 200° C. for 30 seconds at approximately 30 kPa initial pressure. The film was cut into 2.54 cm×7.62 cm coupons for subsequent conversion into peel test specimens.

Comparative Example C-3

Nylon pellets iestamido™ L210F) were pressed into a 0.20 mm thick film by pressing between Teflon™ cloth at 200° C. for 30 seconds at approximately 30 kPa initial pressure. The resulting film was cut into 1.25 cm×5.08 cm coupons for subsequent conversion into peel test specimens.

Comparative Example C-4

Nylon pellets (Vestamido™ L2101F, 100 g) were heated, with stirring, in a 1N HCl solution (200 mL) at gentle reflux overnight. The nylon pellets were remove from the reaction mixture by filtration, washed once with deionized water (100 mL), and dried at 60° C. under reduced pressure (30 mm Hg) for 12 hours. A portion of the dried, acid treated nylon was subsequently pressed into a 0.20 mm thick film by pressing between Teflon™ cloth at 200° C. in a Wabash Hydraulic Press at approximately 30 kPa initial pressure. The film was cut into 2.54 cm×7.62 cm coupons for subsequent conversion into peel test specimens.

Comparative Example C-4

Polyurethane pellets (Morthane™ L424.167, MI=9.8) were pressed into a 0.20 mm thick film by pressing between Teflon™ cloth at 200° C. for 30 seconds at approximately 30 kPa initial pressure. The resulting film was cut into 1.25 cm×5.08 cm coupons for subsequent conversion into peel test specimens.

Peel Test Specimen Preparation

Peel test specimens for the tie layer compositions of Examples 1–10 and comparative Examples C-1 through C-5 were prepared by laminating a film of the tie-layer formulation to a 0.2 mm thick film of THV™ 200 (a tetrafluoroethylene (TFE), hexafluoropropylene (HFP), vinylidene fluoride (VDF) terpolymer, available from Dyneon Corp., St. Paul, Minn.). Three laminate constructions (2.54 cm×7.62 cm) were simultaneously prepared by laminating films of the tie layer composition (prepared as described above) to THV™ 200 films under an approximately 1 kgf/cm² initial pressure for two minutes at 200° C. in a Wabash Hydraulic Press. (Peel test specimens Peel test specimens for the tie layer compositions of Comparative Examples C-1 through C-5 were prepared using 1.25 cm×5.08 cm coupons of the tie-layer compositions and the THV™ 200). Tabs to grip the two film components of the laminate were provided by inserting strips of silicone release paper (#7520, available from 3M Company, St. Paul, Minn.) between a portion of the tie-layer sheet and the THV™ 200 sheet to a depth of approximately 1.25 cm along one short edge of the laminate construction to prevent the two materials from bonding together. The laminate specimens were removed from the hot laminating press after 2 minutes and immediately transferred to a second press which was maintained at room temperature to provide consistent thermal history for all test samples. T-Peel data for all samples is reported in Table 1.

TABLE 1

T-Peel Data

| Example # | Tie-Layer Composition | Peel Adhesion (kg/2.54 cm width) |
|---|---|---|
| 1 | Methanolic KOH treated Nylon | 11.4 |
| 2 | Ethanolic KOH treated Nylon | 13.2 |
| 3 | Methanolic Ba(OH)$_2$ | 3.3 |
| 4 | Nylon/KOH (99/1) | 4.3 |
| 5 | Nylon/KOH (98/2) | 8.4 |
| 6 | Nylon/KOH/Onium (98/1/1) | 6.6 |
| 7 | Nylon/KOH/DDDA (99/0.5/0.5) | 7.1 |
| 8 | NH$_4$OH treated Nylon | 7.6 |
| 9 | Nylon/DBU/Onium (98/1/1/) | 4.1 |
| 10 | Nylon/Na Phenoxide (20.0/1.0) | 5.7[1] |
| 11 | Nylon/Na Trimethylsilanolate (20.0/0.6) | 4.2 |
| 12 | PU/(Nylon/KOH: 99/1) (50/50) | 1.7 |
| 13 | PU/(Nulon/KOH: 98/2) (80/20) | 0.9 |
| 14 | PU/(Nylon/KOH: 98/2) (50/50) | 2.3 |
| 15 | NH$_4$OH treated Polyurethane | 1.3 |
| 16 | KOH treated Polyurethane | 1.0 |
| 17 | Polyurethane/Potassium t-Butoxide (20.0/0.2) | 3.9 |
| 18 | Polyurethane/Sodium Trimethylsilanolate (20.0/0.6) | 1.2 |
| 19 | Polyurethane/Sodium2,2,2-trifluoroethoxide (20.0/0.3) | 2.0 |
| 20 | Polyurethane/Sodium Thioacetate (20.0/0.2) | 0.7 |

TABLE 1-continued

T-Peel Data

| Example # | Tie-Layer Composition | Peel Adhesion (kg/2.54 cm width) |
|---|---|---|
| 21 | Polyurethane/DBU/Onium (98/1/1/) | 3.6 |
| 22 | Polyurethane/ammonium carbonate/Bu$_4$PBr (94.0/5.0/1.0) | 1.1 |
| 23 | Polyurethane/Sodium Trimethylsilanolate/Bu$_4$PBr (20.0/0.6/0.1/) | 3.9[3] |
| C-1 | Nylon/DDDA (99/1) | 13.7 |
| C-2 | Nylon/DDDA 99.5/0.5 | 4.7 |
| C-3 | Nylon | <1.4 |
| C-4 | Acid treated Nylon | 0 |
| C-5 | Polyurethane | 0 |

Example 24

Adhesion to Dehydrofluorinated Fluoropolymer

Dehydrofluorinated THV 200 was prepared by stirring THV-200 pellets (25 g) in methanol (50 mL) containing KOH (15 g) at room temperature for approximately 12 hours. The pellets were isolated by filtration, washed once with water (75 mL), and dried. A portion of the treated pellets were pressed into a 0.20 mm thick film by pressing between Teflon™ cloth at 200° C. for 30 seconds at approximately 30 kPa initial pressure to produce a 0.2 mm thick film. The film was laminated to a base treated polyurethane film and evaluated as described in Example 16. Peel adhesion Peel adhesion value obtained was 2.9 kg/2.54 cm width.

Various modifications and alterations of this invention will be apparent to those skilled in the art without departing from the scope and spirit of this invention, and it should be understood that this invention is not limited to the illustrative embodiments set forth herein.

We claim:

1. A tape product made according to a method of bonding fluoropolymer to substantially non-fluorinated polymeric material, the method comprising the steps of:

(a) providing an amide group-containing substantially non-fluorinated polymer;

(b) treating the substantially non-fluorinated polymer with a base to form a base-treated, substantially non-fluorinated polymeric material where the base is selected from the group consisting of:

(1) those bases represented by the formulas:

$X^+(OH)^-_n$ $X^+(OR)^-_n$ $X^+(OCY_2R_f)^-_n$ $X^+(OSi(R)_3)^-_n$ $X^+(SC(O)R)^-_n$ where:

n is 1 or 2;

X is a monovalent or divalent alkali or alkaline earth ion or is an ammonium ion;

R is a substituted or unsubstituted alkyl, aryl, allyl, aralkyl or arallyl group that may contain one or more catenary or noncatenary heteroatoms and that may contain linear or branched and cyclic or acyclic segments;

$R_f$ is a partially or fully fluorinated, substituted or unsubstituted alkyl, aryl, allyl, aralkyl or aralkyl group that also may contain one or more catenary or noncatenary heteroatoms and that may contain linear or branched and cyclic or acyclic segments; and each Y is independently a hydrogen atom or is an R or $R_f$ group with the proviso that both Y groups are not $R_f$; and (2) ammonium carbonate, ammonium hydroxide, and sodium sulfide; and (c) providing a fluoropolymer;

(d) forming a multi-layer article comprising a substantially non-fluorinated layer made of the base-treated, substantially non-fluorinated polymeric material in contact with a fluorinated layer made of the fluoropolymer and exposing the multilayer article to temperature and pressure conditions sufficient to bond the layers; and (e) applying an adhesive material to at least one outer surface of the multilayer article.

2. A shaped article made according to a method of bonding fluoropolymer to substantially non-fluorinated polymeric material, the method comprising the steps of:

(a) providing an amide group-containing substantially non-fluorinated polymer;

(b) treating the substantially non-fluorinated polymer with a base to form a base-treated, substantially non-fluorinated polymeric material where the base is selected from the group consisting of:

(1) those bases represented by the formulas:

$$X^+(OH)^-_n$$

$$X^+(OR)^-_n$$

$$X^+(OCY_2R_f)^-_n$$

$$X^+(OSi(R)_3)^-_n$$

$$X^+(SC(O)R)^-_n$$

where:

n is 1 or 2;

X is a monovalent or divalent alkali or alkaline earth ion or is an ammonium ion;

R is a substituted or unsubstituted alkyl, aryl, allyl, aralkyl or aralkyl group that may contain one or more catenary or noncatenary heteroatoms and that may contain linear or branched and cyclic or acyclic segments;

$R_f$ is a partially or fully fluorinated, substituted or unsubstituted alkyl, aryl, allyl, aralkyl or aralkyl group that also may contain one or more catenary or noncatenary heteroatoms and that may contain linear or branched and cyclic or acyclic segments; and each Y is independently a hydrogen atom or is an R or $R_f$ group with the proviso that both Y groups are not $R_f$; and (2) ammonium carbonate, ammonium hydroxide, and sodium sulfide; and (c) providing a fluoropolymer; and (d) forming a multi-layer article comprising a substantially non-fluorinated layer made of the base-treated, substantially non-fluorinated polymeric material in contact with a fluorinated layer made of the fluoropolymer and exposing the multi-layer article to temperature and pressure conditions sufficient to bond the layers.

3. A shaped article made according to a method of bonding fluoropolymer to substantially non-fluorinated polymeric material, the method comprising the steps of:

(a) providing an amide group-containing substantially non-fluorinated polymer;

(b) treating the substantially non-fluorinated polymer with a base to form a base-treated, substantially non-fluorinated polymeric material where the base is selected from the group consisting of:

(1) those bases represented by the formulas:

$$X^+(OH)^-_n$$

$$X^+(OR)^-_n$$

$$X^+(OCY_2R_f)^-_n$$

$$X^+(OSi(R)_3)^-_n$$

$$X^+(SC(O)R)^-_n$$

where:

n is 1 or 2;

X is a monovalent or divalent alkali or alkaline earth ion or is an ammonium ion;

R is a substituted or unsubstituted alkyl, aryl, allyl, aralkyl or aralkyl group that may contain one or more catenary or noncatenary heteroatoms and that may contain linear or branched and cyclic or acyclic segments;

$R_f$ is a partially or fully fluorinated, substituted or unsubstituted alkyl, aryl, allyl, aralkyl or aralkyl group that also may contain one or more catenary or noncatenary heteroatoms and that may contain linear or branched and cyclic or acyclic segments; and each Y is independently a hydrogen atom or is an R or $R_f$ group with the proviso that both Y groups are not $R_f$; and (2) ammonium carbonate, ammonium hydroxide, and sodium sulfide, and (c) providing a fluoropolymer;

(d) forming a multilayer article comprising a substantially non-fluorinated layer made of the base-treated, substantially non-fluorinated polymeric material in contact with a fluorinated layer made of the fluoropolymer and exposing the multilayer article to temperature and pressure conditions sufficient to bond the layers; and (e) applying at least one additional layer to at least one side of the resulting multi-layer construction.

4. A multi-layer article comprising:

(a) a first layer comprising fluoropolymer; and (b) a second layer comprising substantially non-fluorinated polymeric material comprising base-treated amide group-containing substantially non-fluorinated polymer wherein said first and said second layers are bonded to one another, and wherein the base is selected from the group consisting of (1) those bases represented by the formulas:

$$X^+(OH)^-_n$$

$$X^+(OR)^-_n$$

$$X^+(OCY_2R_f)^-_n$$

$$X^+(OSi(R)_3)^-_n$$

$$X^+(SC(O)R)^-_n$$

where:

n is 1 or 2;

X is a monovalent or divalent alkali or alkaline earth ion or is an ammonium ion;

R is a substituted or unsubstituted alkyl, aryl, allyl, aralkyl or aralkyl group that may contain one or more catenary or noncatenary heteroatoms and that may contain linear or branched and cyclic or acyclic segments;

$R_f$ is a partially or fully fluorinated, substituted or unsubstituted alkyl, aryl, allyl, aralkyl or aralkyl group that also may contain one or more catenary or noncatenary heteroatoms and that may contain linear or branched and cyclic or acyclic segments; and each Y is independently a hydrogen atom or is an R or $R_f$ group with the proviso that both Y groups are not $R_f$; and (2) ammonium carbonate, ammonium hydroxide, and sodium sulfide.

5. The article of claim 4 further comprising at least one additional layer on at lease one side of said article.

6. The article of claim 4 wherein said amide group-containing substantially non-fluorinated polymer is polyamide or polyurethane.

7. The article of claim 4 wherein said second layer further comprises aliphatic di- or polyamine.

8. The article of claim 4 wherein said base-treated, substantially non-fluorinated polymeric material further comprises one or more additional non-fluorinated polymers miscible with the base-treated polymeric material.

9. The article of claim 4 wherein said fluoropolymer is thermoplastic.

10. The article of claim 4 wherein said fluoropolymer is elastomeric.

11. The article of 4 wherein said fluoropolymer is dehydrofluorinated.

12. The article of claim 4 wherein said fluoropolymer comprises interpolymerized units derived from vinylidene fluoride.

13. The article of claim 4 wherein said fluoropolymer is a homopolymer of vinylidene fluoride or is a copolymer or terpolymer derived from vinylidene fluoride and one or more monomers selected from the group consisting of tetrafluoroethylene, and hexafluoropropylene.

14. The article of claim 4 wherein said fluoropolymer comprises interpolymerized units derived from monomers comprising one or more hexafluoropropylene, tetrafluoroethylene, and chlorotrifluoroethylene monomers and one or more non-fluorinated olefinically-unsaturated monomers.

15. The article of claim 4 further comprises adhesive material disposed on at least one outer surface of the article.

16. The article of claim 15 wherein said article is a tape product.

17. The article of claim 4 wherein said first layer comprises patterned fluoropolymer.

18. The article of claim 17 wherein said article is a drag reduction film.

19. The article of claim 4 wherein said article is a paint replacement film.

20. The article of claim 4 wherein said article is a hose, container, sheet or film.

21. The article of claim 4 further comprising transparent microspheres disposed on at least on outer surface of the article.

22. The article of claim 4 further comprising a retroreflective base sheet.

23. The article of claim 22 wherein said retroreflective base sheet comprised a monolayer of transparent microspheres and reflective means disposed on the side of said microspheres opposite said second layer.

24. The article of claim 23 wherein said retroreflective means are formed on said second layer.

25. The article of claim 23 wherein said retroreflective means are cube-corner reflective elements.

26. A bonding composition comprising substantially non-fluorinated polymeric material comprising base-treated amide group-containing substantially non-fluorinated polymer, and wherein the base is selected from the group consisting of (1) those bases represented by the formulas:

  $X^+(OH)^-_n$

  $X^+(OR)^-_n$

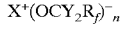  $X^+(OCY_2R_f)^-_n$

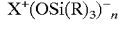  $X^+(OSi(R)_3)^-_n$

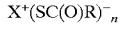  $X^+(SC(O)R)^-_n$ where:

n is 1 or 2;

X is a monovalent or divalent alkali or alkaline earth ion or is an ammonium ion;

R is a substituted or unsubstituted alkyl, aryl, allyl, aralkyl or aralkyl group that may contain one or more catenary or noncatenary heteroatoms and that may contain linear or branched and cyclic or acyclic segments;

$R_f$ is a partially or fully fluorinated, substituted or unsubstituted alkyl, aryl, allyl, aralkyl or arallyl group that also may contain one or more catenary or noncatenary heteroatoms and that may contain linear or branched and cyclic or acyclic segments; and each Y is independently a hydrogen atom or is an R or $R_f$ group with the proviso that both Y groups are not $R_f$; and (2) ammonium carbonate, ammonium hydroxide, and sodium sulfide.

27. A multilayer article comprising:

(a) a first layer comprising substantially non-fluorinated polymeric material comprising base-treated amide group-containing substantially non-fluorinated polymers wherein the base is selected from the group consisting of (1) those bases represented by the formulas:

  $X^+(OH)^-_n$

  $X^+(OR)^-_n$

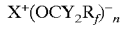  $X^+(OCY_2R_f)^-_n$

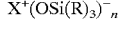  $X^+(OSi(R)_3)^-_n$

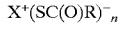  $X^+(SC(O)R)^-_n$ where:

n is 1 or 2;

X is a monovalent or divalent alkali or alkaline earth ion or is an ammonium ion;

R is a substituted or unsubstituted alkyl, aryl, allyl, aralkyl or aralkyl group that may contain one or more catenary or noncatenary heteroatoms and that may contain linear or branched and cyclic or acyclic segments;

$R_f$ is a partially or fully fluorinated, substituted or unsubstituted alkyl, aryl, allyl, aralkyl or aralkyl group that also may contain one or more catenary or noncatenary heteroatoms and that may contain linear or branched and cyclic or acyclic segments, and each Y is independently a hydrogen atom or is an R or $R_f$ group with the proviso that both Y groups are not $R_f$; and (2) ammonium carbonate, ammonium hydroxides and sodium sulfide; and (b) a second layer comprising a dissimilar polymeric material wherein said first and said second layers are bonded to one another.

28. The article of claim 27 wherein said second layer comprises a carboxyl, anhydride, imide, or acid functional polyolefin.

* * * * *

UNITED STATES PATENT AND TRADEMARK OFFICE
CERTIFICATE OF CORRECTION

PATENT NO. : 6,156,400
DATED : December 5, 2000
INVENTOR(S) : Jing, Naiyong

It is certified that error appears in the above-identified patent and that said Letters Patent is hereby corrected as shown below:

Column 5,
Line 49, delete "6,1" and insert in place thereof -- 6,I --.

Column 12,
Line 67, delete "Hills" and insert in place thereof -- Hüls --.

Column 15,
Line 45, delete "Morthanem" and insert in place thereof -- Morthane™ --.
Line 63, delete "Morthanem" and insert in place thereof -- Morthane™ --.

Column 16,
Line 43, delete "iestamido™" and insert in place thereof -- Vestamido™ --.
Line 43, delete "L210F" and insert in place thereof -- L2101F --.
Line 63, delete "C-4" and insert in place thereof -- C-5 --.

Column 17,
Table 1, Ex. 13, delete "PU/Nulon/KOH: 98/2) (80/20)" and insert in place thereof -- PU/Nylon/KOH: 98/2) (80/20) --.

Column 19,
Line 2, delete "aralkyl" and insert in place thereof -- arallyl --.
Line 47, delete "aralkyl" and insert in place thereof -- arallyl --.
Line 51, delete "aralkyl" and insert in place thereof -- arallyl --.

Column 20,
Line 26, delete "aralkyl" and insert in place thereof -- arallyl --.
Line 30, delete "aralkyl" and insert in place thereof -- arallyl --.

Column 21,
Line 5, delete "aralkyl" and insert in place thereof -- arallyl --.
Line 9, delete "aralkyl" and insert in place thereof -- arallyl --.

UNITED STATES PATENT AND TRADEMARK OFFICE
CERTIFICATE OF CORRECTION

PATENT NO. : 6,156,400
DATED : December 5, 2000
INVENTOR(S) : Jing, Naiyong

It is certified that error appears in the above-identified patent and that said Letters Patent is hereby corrected as shown below:

Column 22,
Line 28, delete "aralkyl" and insert in place thereof -- arallyl --.
Lines 45 and 46, delete "polymers" and insert in place thereof -- polymer, --.
Line 63, delete "aralkyl" and insert in place thereof -- arallyl --.
Line 67, delete "aralkyl" and insert in place thereof -- arallyl --.

Column 23,
Line 7, delete "hydroxides" and insert in place thereof -- hydroxide, --.

Signed and Sealed this

Twenty-fifth Day of June, 2002

Attest:

Attesting Officer

JAMES E. ROGAN
*Director of the United States Patent and Trademark Office*